United States Patent [19]
Guthrie et al.

[11] 3,981,904
[45] Sept. 21, 1976

[54] NOVEL URETHANE POLYTHIOLS

[75] Inventors: James Leverette Guthrie, Ashton; Clifton Leroy Kehr, Silver Spring, both of Md.

[73] Assignee: W. R. Grace & Co., New York, N.Y.

[22] Filed: July 24, 1975

[21] Appl. No.: 598,912

Related U.S. Application Data

[62] Division of Ser. No. 546,709, Feb. 3, 1975, abandoned.

[52] U.S. Cl. ..................... 260/471 C; 204/159.18; 204/159.23; 260/77.5 MA; 260/482 B; 260/482 C; 260/609 B; 260/615 R
[51] Int. Cl.² ..................................... C07C 101/44
[58] Field of Search ................... 260/471 C

[56] References Cited

UNITED STATES PATENTS

| | | | |
|---|---|---|---|
| 3,297,745 | 1/1967 | Fekete et al. | 260/471 C |
| 3,637,827 | 1/1972 | Kaiser | 260/471 C |
| 3,883,598 | 5/1975 | Guthrie | 260/471 C |
| 3,914,319 | 10/1975 | Dear et al. | 260/471 C |

*Primary Examiner*—Paul J. Killos
*Attorney, Agent, or Firm*—Elton Fisher

[57] ABSTRACT

A urethane polythiol, which can be a dithiol, is prepared by reacting a hydroxypolythiol, which can be dithiol, with an isocyanate such as a phenyl isocyanate, toluene diisocyanate, and the like.

6 Claims, No Drawings

NOVEL URETHANE POLYTHIOLS

This is a division of application Ser. No. 546,709 filed Feb. 3, 1975, now abandoned.

BACKGROUND OF THE INVENTION

This invention is in the field of urethane polythiols including urethane dithiols. Such polythiols are made by reacting a hydroxy polythiol (a hydric polythiol) including a hydroxy dithiol, with an isocyanate such as phenyl isocyanate or toluene diisocyanate.

Certain urethane polythiols are taught by U.S. Pat. Application Ser. No. 408,338, filed Oct. 23, 1973.

SUMMARY OF THE INVENTION

This invention is directed to urethane polythiols which can be prepared by the reaction of a hydroxy polythiol (including a hydroxy dithiol or a hydroxy trithiol) and an organic isocyanate.

DESCRIPTION OF PREFERRED EMBODIMENTS

Preferred isocyanates for preparing the urethane polythiols of the above Summary include:

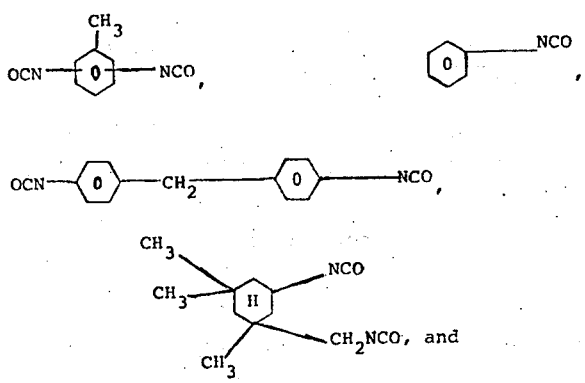

$OCN-CH_2(CH_2)_4CH_2-NCO$.

DETAILED DESCRIPTION OF THE INVENTION

It is an object of this invention to provide urethane polythiols which can be reacted with polyenes to form polymers. An admixture of such polythiol and such polyene can be polymerized by irradiation with actinic light preferably in the presence of a photocuring rate accelerator such as benzophenone, acetophenone, or the like. An admixture of such polythiol and such polyene can also be cured with a peroxide-free radical initiator such as methyl ethyl ketone hydroperoxide or the like. Such polymers are useful:

1. For preparing printing plates.
2. For preparing protective coatings on surfaces including wooden and metallic surfaces.
3. As photoresists where etching designs on metallic surfaces.
4. As bonding agents for laminating (bonding) two or more substrates together.

The following are among the many U.S. Pats. which teach the reaction of polythiols with polyenes to form polymers:

| | |
|---|---|
| 3,535,193 | (Prince, 161/88) |
| 3,578,614 | (Wszolek, 260/13) |

-continued

| | |
|---|---|
| 3,615,450 | (Werber et al, 95/35.1) |
| 3,660,088 | (Lundsager, 96/36) |
| 3,660,217 | (Kehr et al, 161/68) |
| 3,661,744 | (Kehr et al, 204/159.14) |
| 3,662,022 | (Lard, 260/837R) |
| 3,662,023 | (Kehr et al, 260/858) |
| 3,676,283 | (Kehr et al, 161/88) |
| 3,725,228 | (Kehr et al, 204/159.14) |
| 3,725,229 | (Kehr et al, 204/159.14) |
| 3,728,240 | (Lard, 204/159.16) |
| 3,835,085 | (Wrzesinski, 204/159.23) |

As used herein, the term "polythiol" means a thiol which contains at least 2 SH groups per molecule (i.e., it has a functionality of at least 2).

As used herein, the term "polyene" means a polyfunctional compound having at least 2 terminal reactive ethylenically unsaturated carbon-to-carbon bonds per molecule (i.e., it has a functionality of at least 2).

As is well known to those skilled in the art, the total functionality of the polythiol plus the polyene with which it reacts to form a polymer must be greater than 4 and neither the polythiol nor the polyene (polyfunctional compound) can have a functionality less than 2. Thus, where using a polythiol of this invention which has a functionality of 2 (i.e., where the polythiol is a dithiol) to form a polymer by reacting the polythiol with a polyfunctional compound (polyene) of the type described supra, it is necessary that the polyfunctional compound contain at least 3 terminal reactive ethylenically unsaturated carbon-to-carbon bonds per molecule.

It is also an object of this invention to provide a method for preparing polythiols of the type described supra.

Typical hydroxythiols which can be used to prepare urethane polythiol of this invention include:

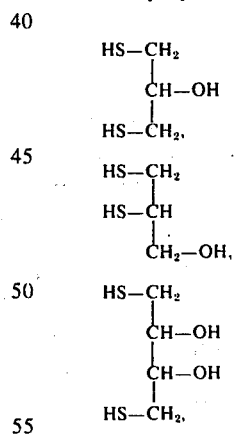

$[HS-(CH_2)_3-O-CH_2]_3C-CH_2-OH$, and

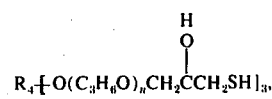

hereinafter TSH, in which $R_4$ is a trivalent saturated hydrocarbon moiety (i.e., a moiety composed (consisting) of carbon and hydrogen) having 12 to 24 carbon atoms and $n$ is 1-2, said polythiol having a thiol value of about 3.6 equivalents (of SH group) per kilogram.

Procedures For Preparing Urethane Polythiols

Urethane polythiols of the type set forth in the above Summary and Preferred Embodiments can be prepared by the following procedures:

Procedure 1

Two moles of 1,3-dimercapto-2-propanol (DMP) and one mole of toluene diisocyanate (e.g., a commercially available mixture of 2,4-and 2,6-toluene diisocyanate or substantially pure 2,4-toluene diisocyanate or substantially pure 2,6-toluene diisocyanate) can be admixed and reacted at about 15°–40°C to form:

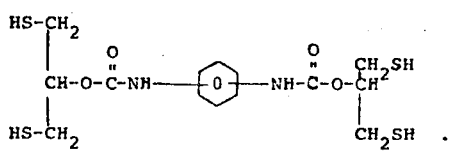

In another embodiment of this procedure (Procedure 1) the DMP can be replaced with 2 moles of 1,2-dimercapto-3-propanol (DMP-3). In this instance the product urethane polythiol will have the formula:

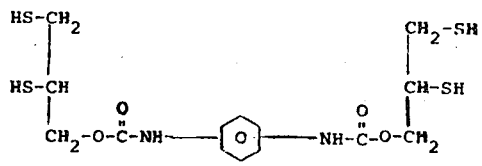

In general, where using Procedure 1, we add the diisocyanate and the hydroxypolythiol in amounts to provide an equivalent ratio of —NCO to —OH of about 1:0.5-2 (preferably 1:1).

Procedure 2

Compounds having the formula:

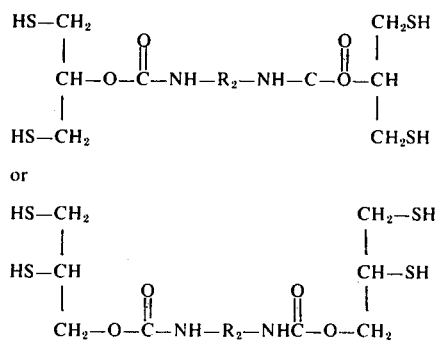

in which $R_2$ is as set forth in Table 1 can be prepared by the general method set forth in Procedure 1, supra, by using DMP or DMP-3 as monohydric polythiol and by replacing the toluene diisocyanate of Procedure 1 with the respective diisocyanates shown in said table.

TABLE 1

| $R_2$ | Diisocyanate |
|---|---|
| —⟨O⟩—CH₂—⟨O⟩— | 4,4'-diphenyl-methane diisocyanate |
| (trimethyl cyclohexyl-CH₂—) | isophorone diisocyanate |
| CH₃O—⟨O⟩—⟨O⟩—OCH₃ | dianisidine diisocyanate |
| CH₃—⟨O⟩—⟨O⟩—CH₃ | o-tolidine diisocyanate |
| CH₃—⟨O⟩—⟨O⟩—CH₃ | m-tolidine diisocyanate |
| —CH₂(CH₂)₄CH₂— | hexamethylene diisocyanate |

Procedure 3

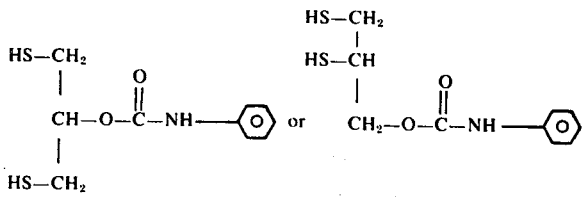

can be prepared by a modification of the general procedure of Procedure 1 wherein the toluene diisocyanate of Procedure 1 is replaced by phenyl isocyanate.

In this procedure the DMP or DMP-3 and the phenylisocyanate are generally added in amounts to provide an equivalent ratio of —NCO to —OH of about 1:0.5-2 (preferably 1:1).

Procedure 4

Compounds having the formula:

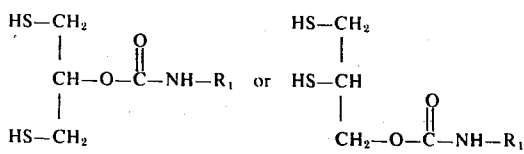

in which $R_1$ is as set forth in Table 2 can be prepared by a modification of the general method set forth in Procedure 3, supra, wherein the phenyl isocyanate of Procedure 3 is replaced with the respective isocyanates shown in said table.

In this procedure the isocyanate and the DMP or DMP-3 are generally admixed in amounts to provide an equivalent ratio of —NCO to —OH of about 1:0.5–2 (preferably 1:1).

TABLE 2

| R₁ | Isocyanate |
|---|---|
| 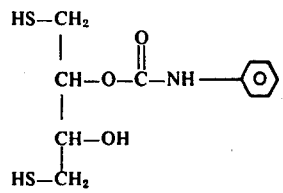 | o-toluene isocyanate<br>m-toluene isocyanate<br>p-toluene isocyanate |
| CH₃—<br>C₂H₅—<br>CH₃CH₂CH₂—<br>(CH₃)₂CH—<br>CH₃(CH₂)₂CH₂—<br>CH₃(CH₂)₄CH₂— | methyl isocyanate<br>ethyl isocyanate<br>n-propyl isocyanate<br>iso-propyl isocyanate<br>n-butyl isocyanate<br>n-hexyl isocyanate |
| 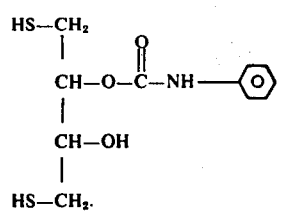 | cyclohexyl isocyanate |
| CH₃(CH₂)₁₆CH₂— | octyldecyl isocyanate |
| 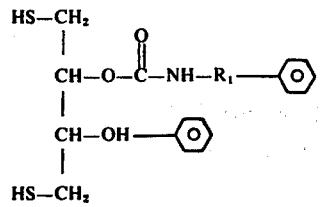 | p-chlorophenyl isocyanate<br>3,4-dichlorophenyl isocyanate |

Procedure 5

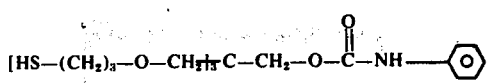

can be prepared by a modification of the general procedure of Procedure 1 wherein; (a) the toluene diisocyanate of Procedure 1 is replaced by phenyl isocyanate; and (b) the DMP or DMP-3 of Procedure 1 is replaced with [HS-(CH₂)₃-O-CH₂]₃C-CH₂-OH using 1 mole of the [HS-(CH₂)₃-O-CH₂]₃C-CH₂OH per 0.5–2 mole (preferably per 1 mole) of phenyl isocyanate.

Procedure 6

Compounds having the formula:

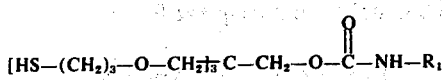

in which R₁ is as set forth in Table 2 can be prepared by the general procedure of Procedure 5, supra, wherein the phenyl isocyanate of Procedure 5 is replaced with the respective isocyanate shown in said table.

The [HS-(CH₃)₃-O-CH₂]₃C-CH₂-OH and the isocyanate are admixed in amounts to provide an equivalent ratio of -NCO to -OH of about 1:0.5–2 (preferably 1:1).

Procedure 7

HS—CH₂
|
CH—O—C(=O)—NH——⟨O⟩
|
CH—OH
|
HS—CH₂ can be prepared by the general procedure of Procedure 1, supra. However, in this instance the procedure is modified by; (a) replacing the DMP or DMP-3 of Procedure 1 with 1,4-dimercapto-2,3-butanediol (DMB); and (b) replacing the toluene diisocyanate of Procedure 1 with phenyl isocyanate. In this instance the mole ratio of DMB to phenyl isocyanate is 1:1 for optimum results, i.e., optimum conversion of reactants to

HS—CH₂
|
CH—O—C(=O)—NH——⟨O⟩
|
CH—OH
|
HS—CH₂.

Procedure 8

A compound having the formula

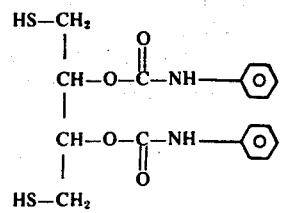

in which R₁ is as set forth in Table 2 can be prepared by the general procedure set forth in Procedure 7, supra, wherein the phenyl isocyanate of Procedure 7 is replaced with the respective isocyanate shown in said table. For optimum results the DMB and the isocyanate are admixed in a mole ratio of 1:1 for if more than 1 equivalent of -CNO is added per 2 equivalents of -OH (i.e., 1 mole of DMB) some of the dieurethane polythiol of Procedure 10 will be formed.

Procedure 9

A compound having the formula:

HS—CH₂
|
CH—O—C(=O)—NH——⟨O⟩
|
CH—O—C(=O)—NH——⟨O⟩
|
HS—CH₂ can be prepared according to the general procedure of Procedure 9. However, in this instance the procedure is modified by having more than 1 mole of isocyanate present per mole of DMB. For optimum results, optimum converstion of reactants to

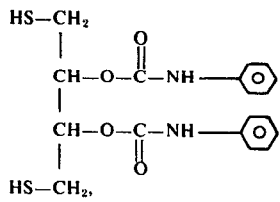

the mole ratio of DMB to the isocyanate should be 1:2. However, where more than 1 mole but less than 2 moles of the isocyanate is present per mole of DMB a mixture of

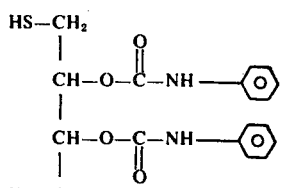

and

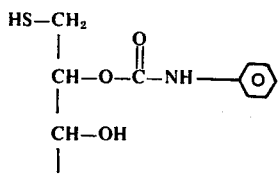

is formed.

Procedure 10

A compound having the formula

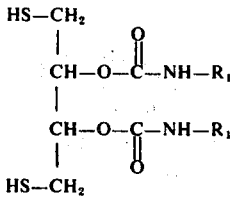

in which $R_1$ is as set forth in Table 2 can be prepared by the general procedure set forth in Procedure 9, supra, wherein the phenyl isocyanate of Procedure 9 is replaced with the respective isocyanate shown in said table.

If this procedure (Procedure 10) is modified by reacting the DMB with an admixture of two isocyanates (preferably using about 1 mole of each per mole of DMB) selected from the group of isocyanates listed in Table 2, supra, the product urethane polythiol will have the formula:

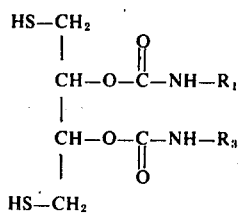

in which $R_1$ and $R_3$ are not identical and each is selected from the group consisting of

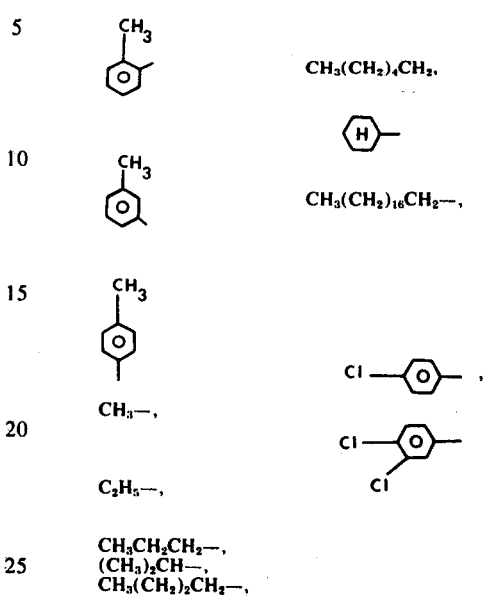

with $R_1$ and $R_3$ corresponding to the isocyanates used (see Table 2).

Procedure 11

A urethane polythiol having the formula:

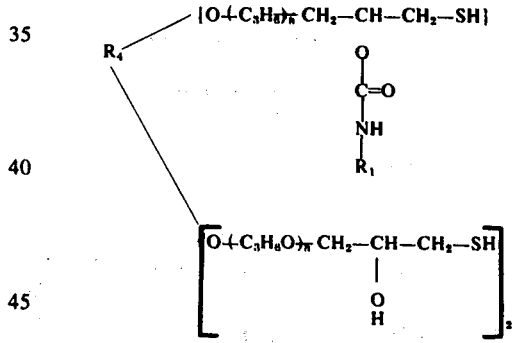

can be prepared by admixing and reacting 1 mole of the above-described TSH and 1 mole of an isocyanate selected from the group of isocyanates listed in Table 2, supra. $R_4$ in said urethane polythiol is a saturated hydrocarbon moiety consisting of carbon and hydrogen and having 12–24 carbon atoms, $n$ is 1–2, and $R_1$ is as shown in Table 2.

Procedure 12

A urethane polythiol having the formula:

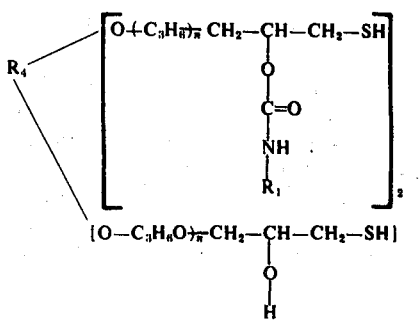

can be prepared by admixing and reacting 1 mole of the aforesaid TSH with 2 moles of an isocyanate selected from isocyanates listed in Table 2, supra. $R_4$ in said urethane polythiol is a saturated hydrocarbon moiety consisting of carbon and hydrogen and having 12–24 carbon atoms, $n$ is 1–2, and $R_1$ is as shown in Table 2.

If this procedure (Procedure 12) is modified by reacting the TSH with an admixture of two isocyanates (preferably using about 1 mole of each per mole of TSH) selected from those isocyanates listed in Table 2, supra, the product urethane polythiol will have the formula:

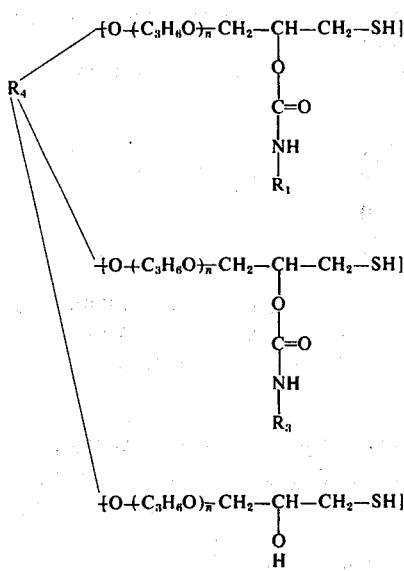

in which $R_4$ and $n$ are as defined supra; $R_1$ and $R_3$ are not identical and each is selected from the group of radicals listed under the heading "$R_1$" in Table 2, supra, with $R_1$ and $R_3$ corresponding to the isocyanates used.

Procedure 13

A urethane polythiol having the formula:

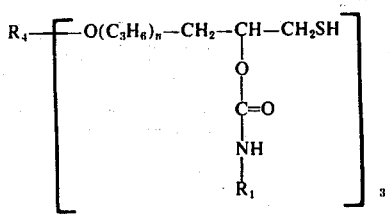

can be prepared by admixing and reacting 1 mole of the above-described TSH with 3 moles of an isocyanate selected from those listed in Table 2, supra. $R_4$ in said urethane polythiol is a saturated hydrocarbon moiety consisting of carbon and hydrogen and having 12–24 carbon atoms, $n$ is 1–2, and $R_1$ is as shown in Table 2.

If this procedure (Procedure 13) is modified by reacting the TSH with a mixture of 3 isocyanates (preferably using a mole of each per mole of TSH) selected from the isocyanates listed in Table 2, supra, the product urethane polythiol will have the formula:

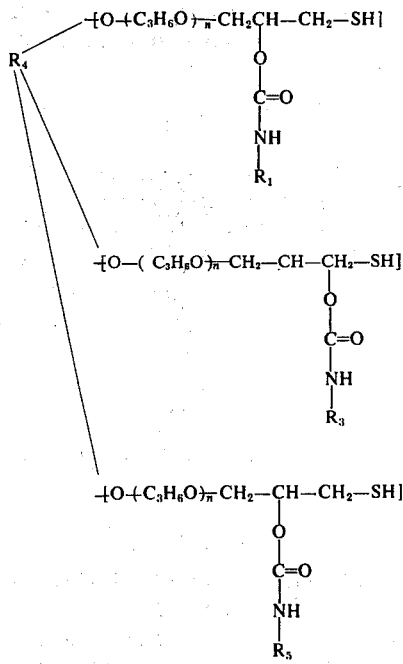

in which $R_4$ and $n$ are as defined, supra, and $R_1$, $R_3$, and $R_5$ are not identical and each is selected from the group of radicals listed under the heading "$R_1$" in Table 2, supra, with $R_1$, $R_3$, and $R_5$ corresponding to the isocyanates used.

Where admixing a hydric (monhydric, dihydric, or trihydric) polythiol and an isocyanate according to any of Procedures 1 through 13 it is generally preferred that the polythiol and the isocyanate be within a temperature range of about 15°–40°C.

If desired, a catalyst (e.g., tin(II) octoate or dibutyl tin dilaurate) can be added to the reactants (reaction mixture) in a catalytic amount to facilitate the formation of any of the urethane polythiols by the above procedures (Procedures 1–13).

The instant invention will be better understood by referring to the following specific but nonlimiting examples.

EXAMPLE I

PREPARATION OF TRIALLYL ETHER OF PENTAERYTHRITOL

Into a 5 liter three-necked flask fitted with condenser and addition funnel was placed a solution of 650 g (16.25 equivalents) of sodium hydroxide in 650 ml of water. To this was added 272 g (two moles) of pentaerythritol. This mixture was stirred by means of a magnetic bar and heated to 70°C. Then 1936 g (1385 ml, 16 moles) of allyl bromide was added over an eight-hour period at such a rate that the temperature stayed between 70° and 80°C. Following this, heating was resumed, keeping the temperature at 80°–82°C for an additional four hours. Volatile materials were removed by distillation at atmospheric pressure until the temperature of the condensing vapor reached 98°C.

One liter of water was added to the hot residue (to prevent crystallization of the salts). The product was cooled to room temperature and the layers were separated. The water layer was extracted twice with 300 ml portions of diethyl ether. The combined organic layers were dried over anhydrous magnesium sulfate and then distilled at atmospheric pressure to remove the diethyl ether. The triallyl ether of pentaerythritol product, i.e.,

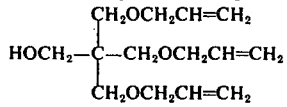

weighed 451 g, 88% conversion, (one pass yield). The infrared and NMR spectra were those expected for the triallyl ether of pentaerythritol. The triallyl ether of pentaerythritol product had a boiling range of 120°–121°C at 1 mm of mercury absolute pressure, $n_D^{24}$ 1.4625.

EXAMPLE II

CONVERSION OF TRIALLYL ETHER TO TRITHIOL

Ten drops of tert-butyl hydroperoxide was added to 85.2 g (1 equivalent of unsaturation) of pentaerythritol triallyl ether from Example I in a 500-ml flask equipped with a condenser and magnetic stirrer. This mixture was heated to 40°C, and 76 g (1 mole) of thiolacetic acid was added during one hour at such a rate that the temperature did not exceed 90°C. After the addition was complete, the product was kept at 80°C for an hour and then allowed to cool to room temperature overnight.

To the product was added a solution of 100 g (2.5 equivalents) of sodium hydroxide in 200 ml of water. This mixture was heated under reflux for three hours and then cooled to room temperature and diluted with 300 ml of ether to facilitate separation of the layers. After separation, the water layer was acidified to pH 2–5 with HCl and then extracted twice with 400-ml portions of ether. Ether was evaporated from the combined organic layers, and the residue was diluted with an equal volume of toluene. The resulting solution was washed with 5% aqueous sodium bicarbonate, then with 5% aqueous hydrochloric acid, and with water. The toluene and other volatile contaminants was removed by distillation at 0.1 mm of mercury absolute pressure until the temperature of the residue reached 225°C. The product (pentaerythritol tris(β-mercaptopropyl) ether, i.e.,

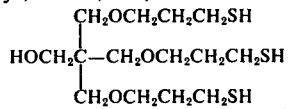

weighed 119 g (100% conversion) and had a mercaptan content of 7.09 milliequivalents per gram. This is 84.6% of the theoretical amount. Said product was designated "Polythiol No. 1". Two additional lots of Polythiol No. 1 were prepared.

Part of the trithiol was distilled at 0.1 mm Hg. The distillate had a boiling range of 243°–245°C and a mercaptan content of 7.88 milliequivalents per gram (94% of theoretical value).

EXAMPLE III

Step A

A 35.8 g portion of Polythiol No. 1 (the polythiol prepared in Example 2, supra) was admixed with a stoichiometric amount (11.1 g) of isophorone diisocyanate to form a first mixture. Then a catlytic amount (ca. 0.05 g) of tin (II) octoate was added to and admixed with the first mixture to form a second mixture. The second mixture was allowed to stand over a weekend (ca. 66 hours) at which time it was examined, analyzed, and tested for unreacted isocyanate groups. It was found that the reaction had gone to substantial completeness and that the reacted mass was substantially free of unreacted isocyanate.

The resulting product which had the formula

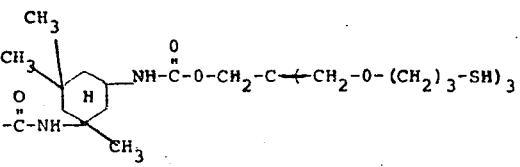
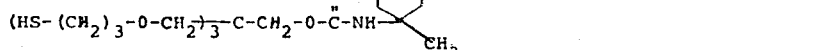

was designated "Urethane Polythiol A". It had a viscosity of 750 centipoises at 22°C. The viscosity of Polythiol No. 1 was 200 centipoises at 22°C.

Step B

An 8 g portion of benzophenone was admixed with and dissolved in a 200 g portion of triallyl isocyanurate to form a solution which was designated "Solution No. 1".

A 23.4 g portion of Solution No. 1 was admixed with the entire portion of Urethane Polythiol A to form a photocurable composition which was designated "Photocurable Composition A".

Step C

An uncured film of Photocurable Composition A having a thickness of about 30 mils (0.03 inch) was spread on a glass plate. Said film was cured by exposure for 5 minutes to a source of actinic light (a 275 watt Sylvania sun lamp placed about 6 inches (15.2 cm) above the uncured film. The resulting cured film was designated "Cured Film A".

EXAMPLE IV

Five additional runs were made using the general procedure of Example 3. However Step A of said procedure was modified in these runs by using 80%, 60%, 40% and 20% of the theoretical amount of isophorone diisocyanate as shown in Table 3. Said table also shows the designations assigned to the cured films.

TABLE 3

| Run No. | Isopherone Diisocyanate Added % of Theoretical | Designation Assigned to Cured Film |
|---|---|---|
| 1 | 80 | Cured Film B |
| 2 | 60 | Cured Film C |
| 3 | 40 | Cured Film D |
| 4 | 20 | Cured Film E |
| 5 | - 0 - (a) | Cured Film F |

(a) In this run Step A was omitted, and a 35.8 g portion of Polythiol No. 1 (from Example 2) was admixed with a stoichiometric amount of Solution No. 1 in Step D.

EXAMPLE V

Tensile properties of the cured films (Cured Films A, B, C, D, E, and F) were determined at 23 using the method set forth in ASTM Designation: D 882–67. Tensile properties of Films A, B, C, D, and E were also determined at 50°C and 100°C. The results obtained are presented in Table 4.

TABLE 4
Tensile Properties of Cured Films

| Cured Film Tested | Temperature °C. | Tensile Strength, psi | Elongation, % (a) |
|---|---|---|---|
| A | 23 | 620 ± 54 | 54 ± 5 |
| B |    | 599 ± 118 | 48 ± 7 |
| C |    | 803 ± 55 | 53 ± 2 |
| D |    | 759 ± 81 | 49 ± 4 |
| E |    | 428 ± 18 | 31 ± 3 |
| F |    | 345 ± 28 | 25 ± 2 |
| A | 50 | 170 ± 16 | 18 ± 2 |
| B |    | 233 ± 17 | 19 ± 2 |
| C |    | 213 ± 17 | 17 ± 1 |
| D |    | 259 ± 65 | 18 ± 2 |
| E |    | 204 ± 23 | 15 ± 1 |
| A | 100 | 78 ± 7 | 5.0 ± 0.6 |
| B |    | 152 ± 12 | 10.0 ± 0.6 |
| C |    | 160 ± 25 | 10.0 ± 1.4 |
| D |    | 168 ± 19 | 10.0 − 0.6 |
| E |    | 119 ± 10 | 7.0 ± 1.4 |

(a) Elongation at breaking point.

As used herein the term "equivalent" as applied to the -OH group means 17 grams of said group. Thus one mole of

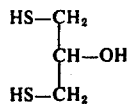

will provide 1 equivalent of -OH and ½ mole of

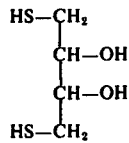

will provide 1 equivalent of -OH.

As used herein the term "equivalent" as applied to the -NCO group means 42 grams of said group. Thus 1 mole of a monoisocyanate (such as phenyl isocyanate) will provide 1 equivalent of -NCO and ½ mole of a pure toluene diisocyanate will provide 1 equivalent of -NCO.

As used herein the term "mole" has its generally accepted meaning, that is, a mole of a substance contains the same number of molecules of the substance as there are carbon atoms in 12 grams of pure $^{12}$C.

"Functionality" as applied to an isocyanate means the number of -NCO groups per molecule.

"Functionality" as applied to a polythiol means the number of -SH groups per molecule.

"Functionality" as applied to a polyene means the number of reactive terminal ethylenically unsaturated groups per molecule.

As used herein the term "polythiols" includes dithiols. Thus a dithiol is considered to be a polythiol.

As used herein the term "TSH" means a trihydric polythiol having the formula $$R_4[O(C_3H_6O)_nCH_2\overset{\overset{\displaystyle H}{\underset{\displaystyle O}{|}}}{C}CH_2SH]_3$$

in which $R_4$ is a trivalent saturated hydrocarbon moiety having 12 to 24 carbon atoms and $n$ is 1–2.

As used herein the term "DMP" means 1,3-dimercapto-2-propanol.

As used herein the term "DMB" means 1,4-dimercapto-2,3-butanediol.

The urethane polythiols of this invention can be characterized and identified by elemental analysis and infrared spectroscopy.

Where preparing the urethane polythiols of this invention we generally prefer to admix and react the diisocyanate and the hydroxythiol at about 15°–40°C. However, temperatures of 0°–100°C (or any temperature or any temperature range within said range of 0°–100°C) are also operable and can produce excellent results.

We claim:

1. A polythiol having the formula

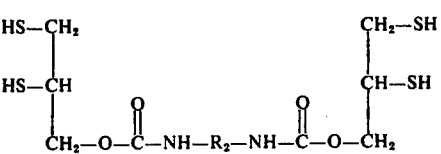

in which
$R_2$ is

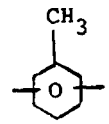,

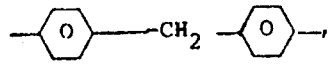,

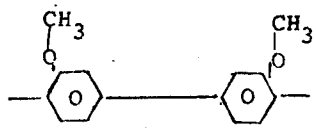,

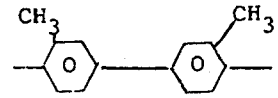,

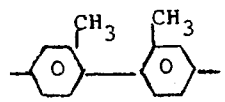

2. The polythiol of claim 1 in which $R_2$ is

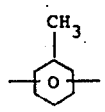

3. The polythiol of claim 1 in which $R_2$ is
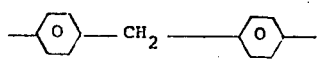
4. The polythiol of claim 1 in which $R_2$ is
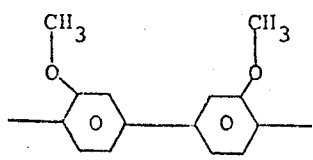
5. The polythiol of claim 1 in which $R_2$ is
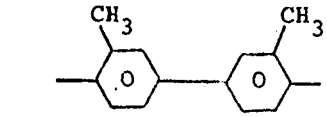
6. The polythiol of claim 1 in which $R_2$ is
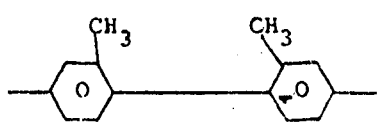
* * * * *